United States Patent [19]

Chino et al.

[11] 3,960,176
[45] June 1, 1976

[54] FLUID LOADING DEVICE

[75] Inventors: Shigeru Chino; Nobuto Miyazaki; Tadaya Takahashi, all of Ageo, Japan

[73] Assignee: Nigata Engineering Co., Ltd., Tokyo, Japan

[22] Filed: June 3, 1975

[21] Appl. No.: 583,483

Related U.S. Application Data

[63] Continuation of Ser. No. 476,498, June 5, 1974, abandoned.

[30] Foreign Application Priority Data

June 6, 1973    Japan.............................. 48-64087

[52] U.S. Cl........................... 137/615; 74/243 NC; 74/245 LP; 33/79 R
[51] Int. Cl.².................................. B67D 5/00
[58] Field of Search............... 137/615; 74/243 NC, 74/245 LP, 243 FC; 33/79 A, 79 B, 79 C, 79 D, 79 R

[56] References Cited
UNITED STATES PATENTS
3,799,197    3/1974    Gibbons............................ 137/615

FOREIGN PATENTS OR APPLICATIONS
5,862    12/1882    United Kingdom............ 74/243 NC

*Primary Examiner*—William R. Cline
*Assistant Examiner*—H. Jay Spiegel
*Attorney, Agent, or Firm*—Sughrue, Rothwell, Mion, Zinn & Macpeak

[57]    ABSTRACT

A fluid loading device for marine application in the form of a fixed, vertical, hollow supporting member fluid connected to a transfer pipe, has mounted thereto one end of an inner hollow arm through a bi-directional swivel joint, allowing the inner hollow arm to rotate freely about vertical and horizontal axes. An outer hollow arm is rotatably mounted for rotation vertically by means of a hollow swivel joint to the outer end of the inner hollow arm about a horizontal axis and carries at its outboard end a swivel joint for rotation vertically and horizontally. Polygonal cam plates which rotate in response to rotation of the outer arm are mounted on the inner and outer ends of the inner hollow arm and rotate with the outer hollow arm and a balancing counterweight, respectively. The cam plates rotate in unison through a loop created by an endless array of end to end linked rods which have an individual length equal to 1/n times the length of one side of the polygonal cam plate, with n being an integer. The point of connection of adjacent rods which overlie adjacent cam plate sides fall on a line bisecting the apex of the cam plate formed by said adjacent cam plate sides.

3 Claims, 6 Drawing Figures

FLUID LOADING DEVICE

This is a continuation of application Ser. No. 476,498, filed June 5, 1974, and now abandoned.

BACKGROUND OF THE INVENTION

1. FIELD OF THE INVENTION

This invention relates to fluid loading devices and more particularly to a balancing mechanism for a loading arm used for loading crude oil or the like onto a tanker subject to rolling and pitching.

2. DESCRIPTION OF THE PRIOR ART

Crude oil, petroleum distillates or like fluid are loaded onto a tanker by means of fluid loading devices which can readily follow the movement of the ship due to wave action and take into consideration the natural rolling and pitching of the tanker as a result thereof. Such fluid loading devices permit connection and disassembly to the fluid manifold of a marine vessel such as a tanker, to be effected easily and simply, and such devices are generally simple in construction, easy to maintain and easy to inspect, etc. Two representative examples of such fluid loading devices are explained relative to the first two figures of the drawings.

Reference to FIG. 1 shows one prior art example of a liquid loading device making use of wire cable. The device comprises an inner hollow arm 1 being pivotably coupled to an outer hollow arm 2 by way of a sheave 11a which is rotatable with arm 2 and mounted for rotation on arm 1. The inner hollow arm 1 is provided with an inner balancing arm 3 which may in fact be an extension thereof, the inner hollow arm 1 being mounted for rotation about a horizontal axis at the upper end of a fixed, vertical hollow supporting member 7, which extends vertically upward and is connected to a source of liquid (not shown). The hollow supporting member 7 supports the inner hollow arm 1 for rotation about both vertical and horizontal axes by a hollow swivel joint 8. A hollow swivel joint 9 couples the outer hollow arm 2 to hollow arm 1 and permits the outer hollow arm 2 to rotate about a horizontal axis extending through the hollow swivel joint 9. A hollow swivel joint connection at 10 at the outer end of the outer hollow arm 2 permits the liquid loading device to be coupled to a tanker manifold (not shown). Balancing weights 5 and 6 are carried by the inner balancing arm 3, weight 5 being concentrically mounted to the outer end of the inner balancing arm 3 beyond sheave 12a. Sheave 12a is mounted for pivoting about a horizontal axis extending through the inner balancing arm 3 and at right angles to the longitudinal axis of that arm. A balancing weight 6 is fixed to the sheave 12a by way of an outer balancing arm 4 which acts as a radial extension of the sheave 12a. Thus, weight 6 rotates at the outer end of balancing arm 4 about the horizontal axis extending through sheave 12a. The rotation of sheave 12a is controlled by the rotation of sheave 11a which in turn is controlled by movement of the outer hollow arm 2 relative to the inner hollow arm 1. Connection between the sheaves is achieved by joining wire cables 13a and 13b by means of fixing members 13c and 13d into an endless wire cable loop trained about sheaves 11a and 12a. The fixing members 13c and 13d fix a point on the wire cables 13a and 13b on sheaves 11a and 12a to effect rotation of one by rotation of the other.

In this construction, when the hollow swivel joint 10 connected to a manifold of a tanker (not shown) is moved with respect to the hollow supporting member 7, due to rolling and pitching of the tanker, the balancing weight 6 moves together with the outer balancing arm 4 by movement of sheaves 11a, 12a and wires cables 13a, 13b, to establish a weight balancing relationship in terms of the equation:

$$Wo(Ro \sin\theta_1 + Li \sin\theta_2) + Wi(Ri \sin\theta_2) - Wci(Rci \sin\theta_2) - Wco(Lc \sin\theta_2 + Rco \sin\theta_1) = 0$$

where
- $Wo$ = weight of outer hollow arm 2, hollow swivel joint 10, etc.,
- $Wi$ = weight of inner hollow arm 1, sheaves 11a, 12a, inner balancing arm 3, etc.,
- $Wco$ = weight of balancing weight 6, outer balancing arm 4, etc.,
- $Wci$ = weight of balancing weight 5 etc.,
- $Ro$ = distance between the pivot axis of outer hollow arm 2 to the gravitational center of Wo,
- $Li$ = length of inner hollow arm,
- $Lc$ = center distance between the pivot axis for the hollow swivel joint 8 and that of sheave 12a,
- $Ri$ = distance from the pivot axis of hollow swivel joint 8 to the gravitational center of Wi,
- $Rci$ = distance from the swivel joint 8 to the gravitational center of Wci,
- $Rco$ = distance from the pivot axis of sheave 12a and outer balancing arm 4 to the gravitational center of Wco.

The construction illustrated in FIG. 1 is such that an equilibrium is maintained by satisfying the relationship $\theta_1 = \theta_2$.

The advantage of this prior art device is that since the maximum angle included between the inner hollow arm 1 and the outer hollow arm 2 is 180°, a wide operating range of the loading arm is obtained. On the other hand, the disadvantage thereof is that an elongation is produced in the wire cable array when it is loaded causing difficulty in maintaining equilibrium and it requires maintenance such as periodic coating with an anticorrosive material, etc. Besides the construction of FIG. 1, such devices are constructed employing sprocket wheels instead of sheaves 11a, 12a and endless chains are used instead of wire cables such as 13a, 13b, but the elongation due to wear and the disadvantageous maintenance are not materially reduced.

FIG. 2 shows a second example of a prior art fluid loading device using instead of the cable array and sheaves, a single connection rod, and wherein parts identical to those shown in FIG. 1 are given like numerical designations. Thus, the parts designated by numerals 1–10 and the construction thereof are substantially the same as that shown in FIG. 1. In FIG. 2, an arm 11b which is rotatably mounted to follow the rotation of the outer hollow arm 2 relative to the inner hollow arm 1, has pivotably connected thereto, at one end, a single connecting rod 13e which in turn is pivoted to the outer end of a balancing arm 4 and which constitutes a parallel link to the inner hollow arm 1. It is so arranged that equilibrium is maintained as in the case of FIG. 1 by movement of the balancing weight 6 coupled also to the outer end of arm 4 by the connection through connecting rod 13e, and arm 11b follows movement of the hollow outer arm 2.

In the device of FIG. 2, the maintenance and inspection may be effected in an easier manner as compared with the case of the wire and cable arrangement of the device shown in FIG. 1. On the other hand, it is necessary to maintain the maximum included angle within a limit in order to restrict the load applied to the connection rod 13e. Furthermore, when the outer hollow arm 2 is retracted inwardly, as shown at the right in FIG. 2, a large compressive force acts on the connecting rod 13e which operates to balance the rotating force of the outer hollow arm 2 and the outer balancing arm 4 due to their own weights so that a further drawback occurs in the prior art device of FIG. 2 in that it is necessary to provide a connecting rod 13e with a relatively large cross sectional area to provide the necessary buckling strength due to the effects of the compressive force acting thereon.

SUMMARY OF THE INVENTION

The present invention provides a balancing mechanism for the loading arm, wherein the drawbacks of both prior art device, FIGS. 1 and 2, are eliminated.

Where a fluid loading device comprising a fixed hollow supporting member is connected to a transfer pipe and extends vertically upwards from a wharf or the like and pivotably supports an inner hollow arm on a hollow swivel joint so that the hollow inner arm rotates freely in a vertical and horizontal direction and in turn supports at its outer end an outer hollow arm mounted for rotation in a vertical direction about a horizontal axis, and wherein the outer hollow arm at its end remote from the pivotable connection to the inner hollow arm carries a swivel joint permitting rotation both in a vertical direction and a horizontal direction, the device is improved by providing a polygonal cam plate which rotates in response to rotation of the outer hollow arm about the horizontal axis at the end of the inner hollow arm coupled to the outer hollow arm and a second polygonal cam plate for rotation on the inner balancing arm to the opposite side of the pivot connection between the hollow supporting member and the inner hollow arm. The polygonal cam plate mounted to the inner balancing arm is provided with an outer balancing arm rotatable therewith and carries a balancing counterweight at the outboard end of the same. End to end linked rods form an endless loop trained about said cam plates and drivingly coupling the polygonal cam plates together to insure rotation of the cam plate carrying the balancing counterweight, driven by movement of the outer hollow arm. Preferably, the end to end linked rods have an individual length equal to $1/n$ times the length of one side of the polygonal cam plate, where n is an integer. The arrangement of the end to end linked rods are such that the point of connection between adjacent rods which overlie adjacent cam plate sides fall on a line bisecting the apex of the cam plate formed by said adjacent cam plate sides.

DESCRIPTION OF THE PREFERRED EMBODIMENT

Figure 1:
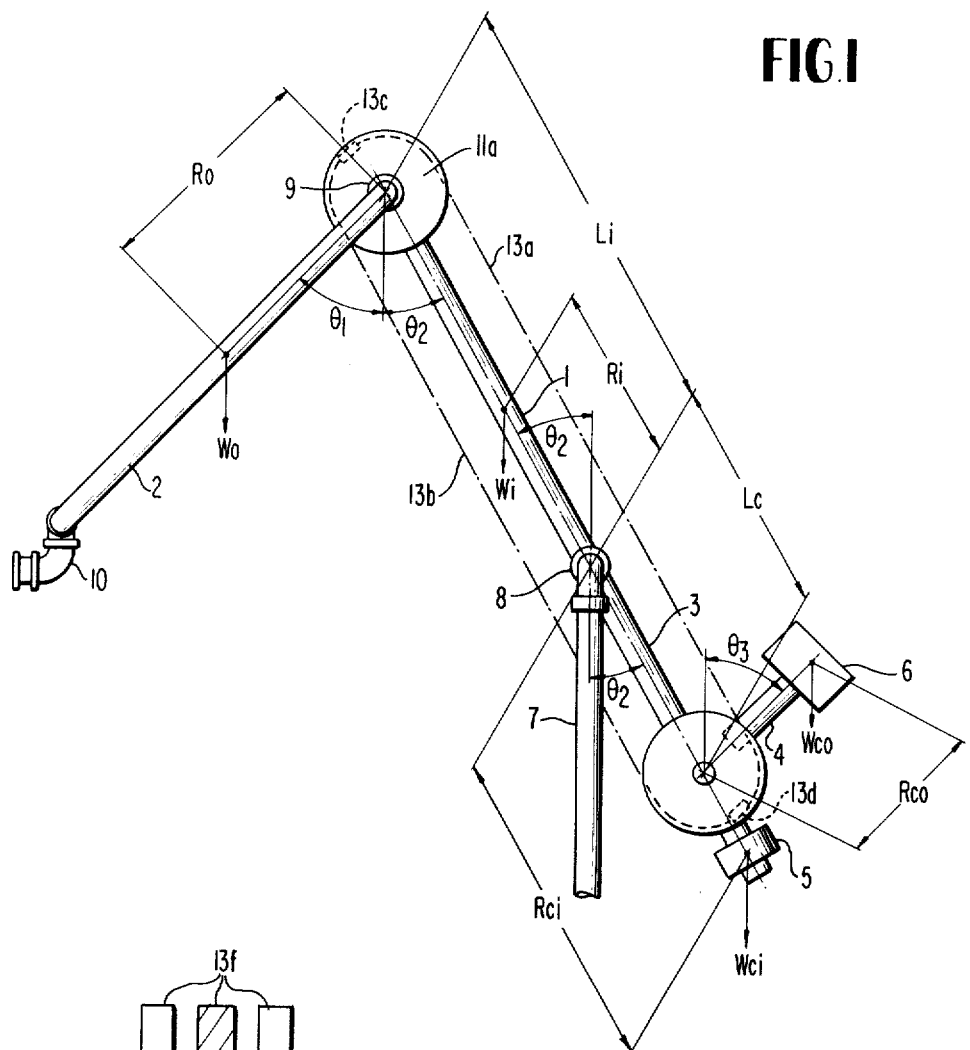
FIG. 1 is a schematic, front view of a conventional fluid loading device in one form.
Figure 6:
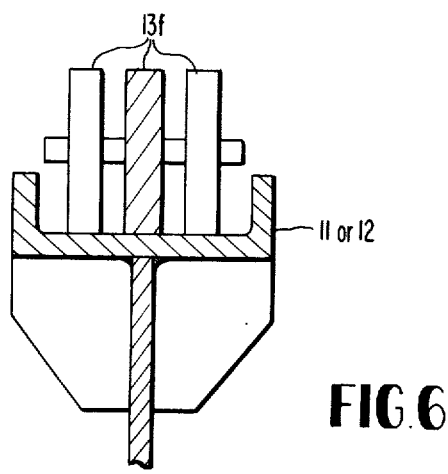
FIG. 6 is a sectional view of a portion of the device shown in FIG. 3 taken about line 6—6.
Figure 2:
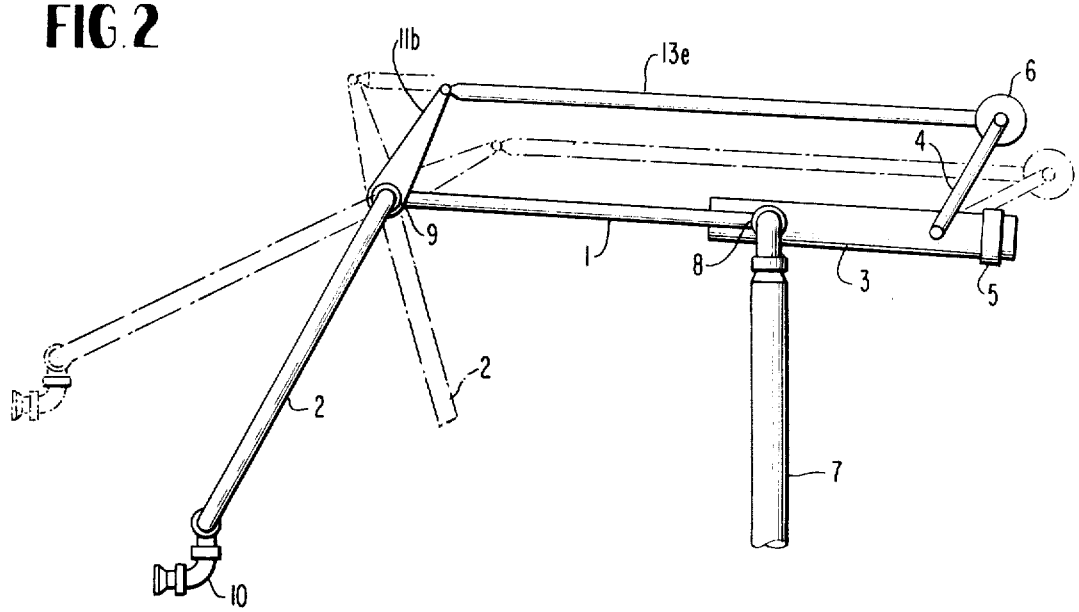
FIG. 2 is a front view of a second from of a conventional fluid loading device.
Figure 3:
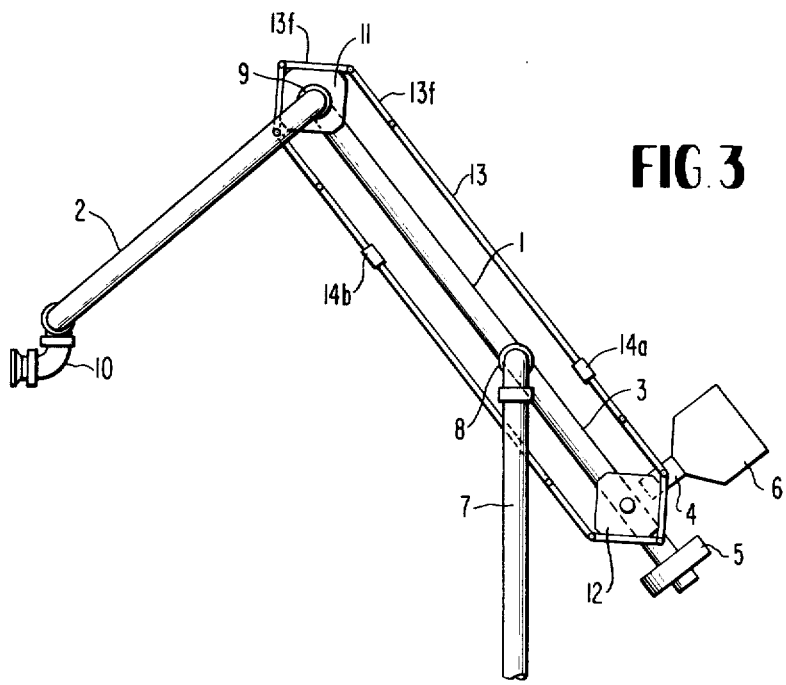
FIG. 3 is a front view of a fluid loading device in accordance with the present invention in preferred form, with the arms in positions corresponding to that of the prior art device of FIG. 1.
Figure 4:
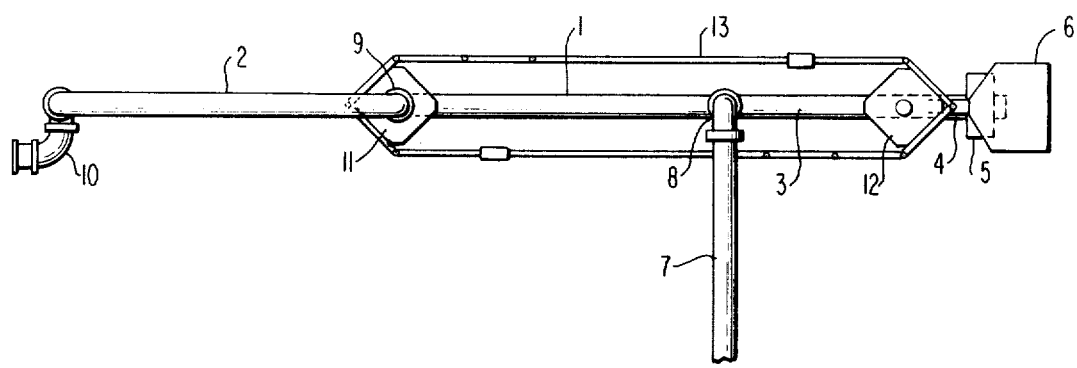
FIG. 4 is a front view of the fluid loading device of the present invention, shown in FIG. 3, with the hollow arm pivoted to in line position.
Figure 5:
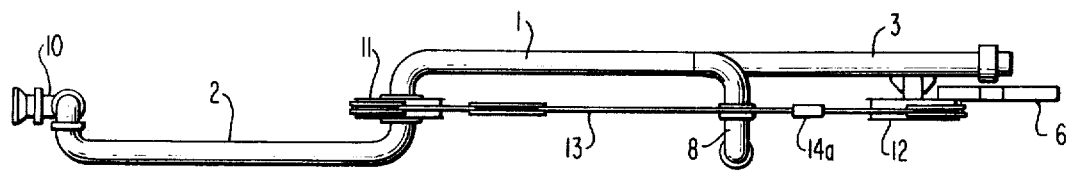
FIG. 5 is a top plan view of the device shown in FIG. 4.

With reference to FIGS. 3–6, parts of the fluid loading device of the present invention which are common to the prior art devices of FIGS. 1 and 2 bear like numerical designations. In this respect, numeral 1 desginates the inner hollow arm, 2 the outer hollow arm, 3 the inner balancing arm, 4 an outer balancing arm, 5 and 6, balancing weights, 7 a fixed hollow supporting member extending vertically upward from a wharf (not shown). The numerals 8, 9 and 10 designate hollow swivel joints in the manner of the prior art devices. The hollow swivel joints 8, 9 and 10 allow free rotation of the inner hollow arm 1 in a vertical and horizontal direction relative to the hollow supporting member 7 which extends vertically upwards, the outer hollow arm 2 in a vertical direction relative to the inner hollow arm 1 and about a horizontal axis, and of outer hollow arm 2 in vertical and horizontal directions relative to the manifold (not shown) of a tanker or the like to which the device is connected by way of swivel joint 10. The construction of the swivel joint is the same as the swivel joints in the conventional device illustrated in FIGS. 1 and 2.

A cam plate 11 which is polygonal in plan configuration is secured to the outer hollow arm 2, and a cam plate 12 of similar configuration is supported for rotation about a horizontal axis at a point on the inner balancing arm 3 intermediate of weight 5 and the horizontal pivot axis of the hollow swivel joint 8. A series of small rods 13f are linked together to define an endless loop as at 13 with the linked connecting rods being trained about respective cam plates 11 and 12, such that pivoting of the outer hollow arm 2 about a horizontal axis defined by swivel joint 9 causes cam plate 11 to pivot about the same axis, and by way of linked rods 13f a similar rotation and to the same degree, of the polygonal cam plate 12 about a horizontal pivot axis on the inner balancing arm 3. Turnbuckles 14a and 14b permit tensioning of the loop of linked rods 13f. The connecting rod loop 13 interlocks the operations of the outer hollow arm 2 and the outer balancing arm 4 and maintains a substantial weight equilibrium therebetween. The relationship of the polygonal cam plate and the directly linked series of small rods for cam plates 11 and 12 and the length of the same are such that the points of connection of adjacent rods which overlie adjacent cam plate sides fall on a line bisecting the apex of the cam plate formed by said adjacent cam plate sides in each instance. It is this arrangement which eliminates the necessity of chain sprocket wheels and a smooth transmision of rotary motion can be very practically obtained.

The hollow supporting member 7 is connected to a liquid transfer pipe (not shown) at the pier or wharf and the hollow swivel joint 10 is connected to a manifold (not shown) of a tanker or the like. In this condition, the tanker is connected to the liquid transferring pipe at the pier or wharf through hollow swivel joints 8, 9 and 10, outer hollow arm 2, inner hollow arm 1 and hollow supporting member 7, whereby the transfer of liquid can be effected regardless of pitch or other movement of the tanker. During this time, even when the tanker is moved vertically or horizontally due to the variation in total load and changes in inclination due to wave action or tide action, the balance of the dead weight of the loading arm is maintained by means of the balance weights 5 and 6. Only a frictional force caused by rotation of the hollow swivel joints 8, 9 and 10 and other small resistive forces act on the manifold of the tanker, so that the loading arm can easily follow the movement of the tanker and thus a safe loading operation can be effectively carried out.

The advantages of the present liquid loading device as constructed are as follows: The first advantage is that with the construction of the connecting rod loop 13, formed by training the loop of linked rods over the cam plates 11 and 12, each of which has a tetragonal shape, only tension acts on the connecting rods so that there is no danger of buckling and the mass of the parts can therefore be reduced. While it is preferable that the cam plates 11 and 12 each have a tetragonal shape, the shape is limited to a polygon, and the plates may take the shape of a pentagon or hexagon if desired. In the second place, it is possible to obtain a maximum reach by controlling the maximum included angle between the inner hollow arm 1 and the outer hollow arm 2 to 180° using the linked rods 13f. Thirdly, in a broad sense, although a plurality of small rods 13f constituting the connecting rod loop 13, may be at first glance thought to be a modification of a power transmitting chain, by utilizing a tetragonal cam plate arrangement, chain sprocket wheels are not necessary, and a smooth transmission of rotary motion can be very practically obtained, serving as a balancing device for the loading arm, without requiring means corresponding to the braking means normally employed where a wire cable is used. In short, the present fluid loading device makes maximum advantage of the conventional wire cable system and the single interlocking rod system and compensates for the disadvantages of both, whereby the rotating range can be increased, the maintenance and inspection may be effected more easily, and an excellent, easily operable, fluid loading device is the result.

Furthermore, the cam plate 12 is not limited in terms of its being pivoted on the interbalancing arm 3, but it also may be pivotably mounted at the hollow swivel joint 8, for rotation about a common horizontal axis. In this case, the weight of the balancing weight 6 is determined by placing within the equation, $Lc = 0$. It is possible, theoretically, to combine more than two small rods 13f for a single side of the cam plate by setting the length of the small rod 13f at a value of $1/n$ times the side length of the cam plate, where n is an integer.

While the invention has been particularly shown and described with reference to a preferred embodiment thereof, it will be understood by those skilled in the art that various changes in form and details may be made therein without departing from the spirit and scope of the invention.

What is claimed is:

1. In a fluid loading device of the type including a vertical hollow supporting member pivotably supporting at its upper end for rotation about a first horizontal axis, an inner hollow arm which in turn has pivotably supported at one end thereof, for rotation about a second horizontal axis, an outer hollow arm, the improvement comprising:

a first equilateral polygonal cam plate mounted to said outer hollow arm, for rotation about said second horizontal axis with said outer hollow arm;

a second similar equilateral polygonal cam plate mounted to said inner balancing arm for pivoting freely about a horizontal axis;

a balancing weight mounted to said second polygonal cam plate radially outward of its pivot axis and in a circumferential position related to the circumferential position of said outer hollow arm relative to said first polygonal cam plate;

a first plurality of linked rods trained about said first polygonal cam plate such that, in each instance, the point of connection of adjacent rods which overlie adjacent cam plate sides fall on a line bisecting the apex of said first cam plate formed by said adjacent cam plate sides, each of said first plurality of rods having a length equal to $1/n$ times the length of one side of the associated cam plate where n is an integer;

a second plurality of linked rods trained about said second polygonal cam plate such that, in each instance, the point of connection of adjacent rods which overlie adjacent cam plate sides fall on a line bisecting the apex of said second cam plate formed by said adjacent cam plate sides, each of said second plurality of rods having a length equal to $1/n$ times the length of one side of the associated cam plate where n is an integer;

a single linked rod connecting the driven end of said first plurality of linked rods to the driving end of said second plurality of linked rods, said single linked rod being longer in length than the sides of said first and second cam plates; and a single linked rod connecting the driven end of said second plurality of linked rods to the driving end of said first plurality of linked rods, said single linked rod being longer in length than the sides of said first and second cam plates.

2. The fluid loading device as claimed in claim 1, wherein each rod in said first and second plurality of linked rods has a length equal to the length of one side of the associated polygonal cam.

3. The fluid loading device as claimed in claim 1 and further comprising a turnbuckle in each of said single linked rods to permit tensioning of said first and second pluralities of linked rods.

* * * * *